United States Patent Office 3,726,878
Patented Apr. 10, 1973

3,726,878
PYRIDINE THIOACETAMIDE DERIVATIVES
Yoshio Kanai, Osaka, Haruomi Honda, Kawanishi, Hyogo, Yasushi Sanno, Osaka, Kawani, Akira Nohara, Kyoto, and Morio Kanno, Osaka, Japan, assignors to Takeda Chemical Industries, Ltd., Osaka, Japan
No Drawing. Filed July 7, 1970, Ser. No. 53,008
Claims priority, application Japan, July 8, 1969, 44/53,946
Int. Cl. C07d 31/50
U.S. Cl. 260—294.8 E                 19 Claims

ABSTRACT OF THE DISCLOSURE

Compounds of the formula

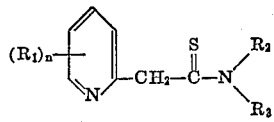

wherein $R_1$ is hydrogen, lower alkyl, lower alkoxy or halogen and $n$ is an integer of 1 to 4, or wherein $(R_1)_n$ is a divalent straight chain hydrocarbon radical having 4 carbon atoms which is attached to the 5th and 6th positions of the pyridine ring, each of $R_2$ and $R_3$ independently represents hydrogen, lower alkyl, aralkyl or aryl, or $R_2$ and $R_3$ together with the nitrogen atom to which they are attached form a heterocyclic ring with a proviso that at least one of $R_1$, $R_2$ and $R_3$ is other than hydrogen and a pharmaceutically acceptable salt thereof with acids.

This invention relates to a novel pyridine thioacetamide derivative useful for treatment and/or prevention of gastric diseases, and further relates to a method for the production of the pyridine thioacetamide derivative.

The present inventors have succeeded in synthesizing a series of novel pyridine thioacetamide derivatives represented by the general formula shown below, and further, with regard to the novel compounds, the inventors have found the following fact.

Namely, the pyridine thioacetamide derivative can supress excessive secretion of gastric juice caused by histamine, gastrine or acetylcholine, without producing undesirable effect on digestive secretions in the other organs such as pancreas, gall bladder and liver, and also without showing uncoupling of oxidative phosphorylation in mytocondoria. Thus, the compound of the present invention can prevent or treat effectively hyperacidity, peptic ulcer and duodenal ulcer without causing any undesirable side effect by oral or parenteral administration.

The present invention has been accomplished on the basis of these findings.

Thus, the principal object of the present invention is to provide novel pyridine thioacetamide derivatives which are useful for treatment and/or prevention of peptic ulcer, duodenal ulcer or hyperacidity and show low toxicity and no or only a slight side effect.

Another object of the present invention is to provide a method for the production of the novel pyridine thioacetamide derivatives.

The novel pyridine thioacetamide derivatives of the present invention are represented by the following general formula:

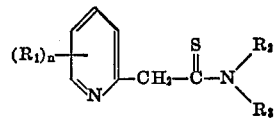

wherein $R_1$ is H, lower alkyl, alkoxy or halogen and $n$ is an integer of 1 to 4, or wherein $(R_1)_n$ is a divalent straight chain hydrocarbon radical having 4 carbon atoms which is attached to the 5- and 6-positions of the pyridine ring, each of $R_2$ and $R_3$ independently is hydrogen, lower alkyl, aralkyl, aryl, or where $R_2$ and $R_3$ form a heterocyclic ring together with the adjacent nitrogen atom, with a proviso that at least one of $R_1$, $R_2$ and $R_3$ is other than hydrogen.

The lower alkyl represented by $R_1$, $R_2$ and $R_3$ may be the same or different and is preferably one having up to 4 carbon atoms such as methyl, ethyl, propyl, isopropyl, butyl, iso-butyl, sec-butyl and tert-butyl. The alkoxy represented by $R_1$ is preferably lower alkoxy having up to 4 carbon atoms such as methoxy, ethoxy, propoxy, iso-propoxy, butoxy, iso-butoxy, sec-butoxy and tert-butoxy. The radical of $(R_1)_n$ may be a divalent straight chain hydrocarbon having 4 carbon atoms, which is attached to the 5th and 6th positions of the pyridine ring, and this radical is exemplified by

—CH=CH—CH=CH—, —CH=CH—CH$_2$—CH$_2$—

—CH$_2$—CH$_2$—CH$_2$—CH$_2$—, etc. Namely in the above cases, the radical of

is quinolyl, dihydroquinolyl and tetrahydroquinolyl radical, respectively. The halogen represented by $R_1$ includes chlorine, bromine, iodine and fluorine. The aralkyl represented by $R_2$ or $R_3$ is preferably phenyl lower alkyl exemplified by benzyl or phenethyl. The aryl represented by $R_2$ or $R_3$ is exemplified by phenyl and naphthyl. The heterocyclic ring which is formed with $R_2$, $R_3$ and the adjacent nitrogen atom is preferably 5 or 6 membered and may contain additional hetero atoms and is exemplified by six membered ones such as piperazine, piperidine and morpholine, and five membered ones such as pyrrolidine.

The pyridine thioacetamide derivatives of the above Formula I form acid addition salts with suitable acids such as inorganic acids (e.g., hydrochloric acid, nitric acid, phosphoric acid, oxalic acid, succinic acid, malic acid, maleic acid, malonic acid, tartaric acid, benzoic acid, toluene sulfoni acid, methane sulfonic acid, etc.), and also can form a quaternary ammonium salt such as 1-methyl pyridinium chloride, 1-methyl pyridinium bromide, 1-ethyl pyridinium chloride, 1-ethyl pyridinium bromide, 1-methyl pyridinium iodide, 1-ethyl pyridinium iodide, etc.

Any of these salts, so far as pharmaceutically acceptable, can be used for the purpose of the present invention.

The object compound (I) of the present invention can be produced by one of the methods as summarized below.

In the following, the methods of Group (A) can be applied to the production of any of the present compounds; the method of Group (B) can be applied to the production of the present compound (I) wherein both of $R_2$ and $R_3$ are hydrogen or that wherein one of $R_2$ and $R_3$ is lower alkyl, aryl or aralkyl and the other is hydrogen; and the methods of Group (C) can be applied to the production of the present compound (I) wherein both of $R_2$ and $R_3$ are hydrogen.

Group (A).—The methods applicable to the production of any of the present compounds.

(1)
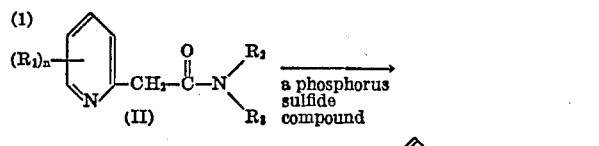

(2)
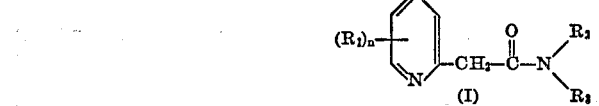

(3)
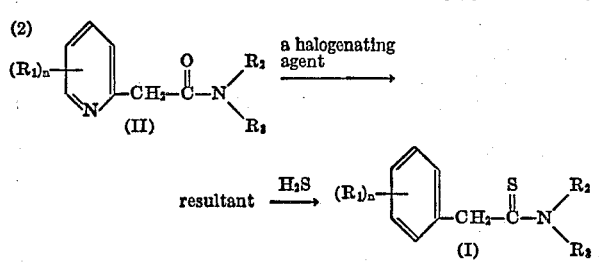

wherein $n$, $R_1$, $R_2$ and $R_3$ have the same meaning as above, and $R_2'$ and $R_3'$ have the same meaning as $R_2$ and $R_3$ except that $R_2'$ and $R_3'$ are not both hydrogen atoms.

Group (B).—The method applicable to the production of the present compound (I) wherein one of $R_2$ and $R_3$ is lower alkyl, aryl or aralkyl and the other is hydrogen or that wherein both of $R_2$ and $R_3$ are hydrogen.

(4)
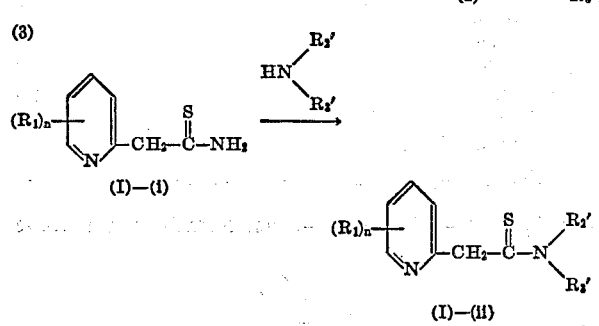

wherein $R_1$, $R_2$ and $n$ have the same meaning as above.

Group (C).—The methods applicable to the production of the present compound (I) wherein both of $R_2$ and $R_3$ are hydrogen.

(5)
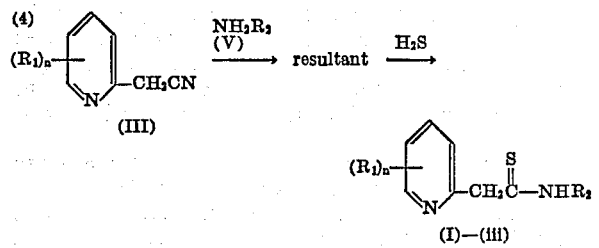

(6)
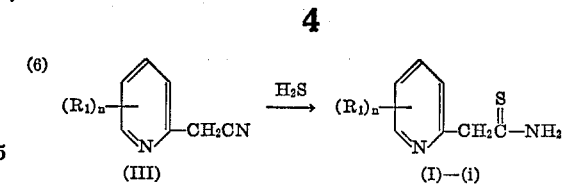

(7)
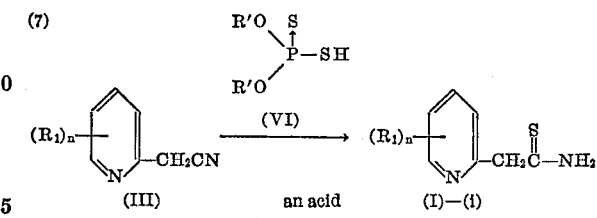

wherein $R_1$ and $n$ have the same meaning as above, and $R'$ is alkyl, and R is lower alkyl, aryl or aralkyl.

The object compounds of the present invention are most generally prepared according to the methods of Group (A)(1), (2) or (3). Namely, the compound of the Formula II is allowed to react with a phosphorus sulfide compound or it is at first allowed to react with a halogenating agent and then allowed to react with hydrogen sulfide, and when the resultant is a compound of the Formula I wherein both $R_2$ and $R_3$ are hydrogen, the resultant may be converted to the compound of the Formula I–(ii) by reacting with a primary or secondary amine of the formula

In the method (1), the phosphorus sulfide compound employable is exemplified by diphosphorus pentasulfide, tetraphosphorus trisulfide, tetraphosphorus pentasulfide and tetraphosphorus heptasulfide. Among them, diphosphorus pentasulfide is most desirable. An amount of the phosphorus sulfide compound to be used is 0.2 to 2 moles per mole of the compound (II).

The reaction is generally conducted in the presence of a suitable inert solvent (e.g. petroleum ether, benzene, toluene, xylene, etc.).

In this reaction, it is preferable to use a basic compound such as organic amines (e.g. ethylamine, diethylamine, triethylamine, diethylaniline, picoline, piperidine, morpholine, quinoline, pyridine, etc.).

As the compound can take a part also as a reaction solvent, it may be used in a large excess amount with or without other solvent. The reaction temperature generally ranges from about 20° C. to about 200° C. The pyridine thioacetamide derivatives (I) thus produced can be recovered from the reaction mixture after a per se conventional manner, for example, by evaporating the solvent.

In the method (2), the compound (II) is at first allowed to react with a halogenating agent.

The halogenating agent employable includes, for example, phosgene, phosphorous halides (e.g., phosphorous oxychloride, phosphorus pentachloride, phosphorus trichloride and tetrachloropyrophosphoric acid), thionyl chloride and sulfuryl chloride. Among them, the phosphorus halides are preferable.

The amount of the halogenating agent employed varies depending on the kind of the halogenating agent and generally falls within the range of about 0.1 to about 2 moles per mole of the compound (II). The reaction is conducted generally at a temperature of about −20° C. to about 30° C., more preferably under cooling, in the presence of a suitable solvent such as ethyl ether, benzene, petroleum ether, pyridine and quinoline.

The resultant is then, without separation nor purification, or after suitable separation or purification, allowed to react with hydrogen sulfide.

This reaction is generally conducted by introducing hydrogen sulfide gas into the reaction system at a temperature of about −20° C. to about 50° C. An amount of the hydrogen sulfide introduced is not less than about 1 mole, generally excessive, conventionally up to about 20 moles, per mole of the compound (II).

The pyridine thioacetamide derivative (I) produced as above can be isolated by per se conventional means, for example, by evaporating the solvent.

The starting compound (II) employed in the methods (1) and (2) can be prepared after a conventional manner, a representative of which is summarized in the following scheme.

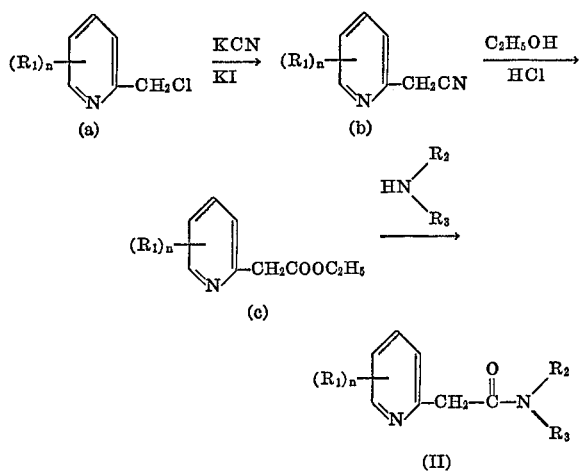

That is to say, the compound (a) is allowed to react with potassium cyanide in an aqueous alcohol under the presence of potassium iodide, and the resulting compound (b) is subjected to the action of hydrogen chloride in alcohol, and finally the resulting compound (c) in allowed to react with the corresponding amine of the formula

When the product of the method (1) or (2) is that wherein $R_2$ and $R_3$ are hydrogen, this product can be converted, if desired, to the compound of the Formula I–(ii) by a reaction with a compound of the formula

$R_2'$ and $R_3'$ are, same or different, hydrogen, alkyls (e.g. methyl, ethyl, propyl, butyl, etc.), aryls (e.g. phenyl, etc.), aralkyls (e.g. benzyl, phenethyl etc.) or from, together with the adjacent nitrogen atom, heterocyclic groups (e.g. piperazine, piperidine, pyrrolidine, morpholine, etc.), with a proviso that $R_2'$ and $R_3'$ are not both hydrogen atoms.

The reaction is conducted generally in the presence of a suitable solvent such as water, methanol, ethanol, ethyl ether, benzene, toluene, xylene, dimethylformamide, dimethylsulfoxide and pyridine. An amount of the amine employed is not less than about 1 mole and conventionally up to about 10 moles per mole of the compound I–(i). The reaction temperature generally ranges from about 0° C. to about 150° C.

The resultant can be isolated by per se conventional means, for example, by evaporating the solvent from the reaction system.

The object compound of the present invention wherein both $R_2$ and $R_3$ or either of $R_2$ or $R_3$ are hydrogen atom (i.e. a compound of the formula

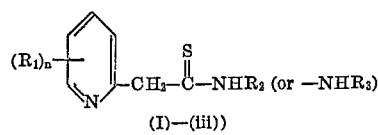

can be prepared also by the method of Group (B) (method (4)).

In the method (4), a compound of the general Formula III is at first allowed to react with a primary amine of the general formula $$R_2NH_2 \qquad (V)$$

(wherein $R_2$ has the same meaning as defined before), and then the resultant is allowed to react with hydrogen sulfide.

The reaction of the first step is conducted generally in the presence of a suitable solvent such as methanol, ethanol, ethyl ether, benzene, toluene, xylene, dimethylformamide, dimethylsulfoxide, pyridine and quinoline. A basic compound such as organic amines (e.g. triethylamine, diethylaniline, quinoline, pyridine, etc.) may be present in the reaction system as a catalyst.

The reaction can proceed at a temperature of about −20° C. to about 100° C., and is preferably conducted under cooling. An amount of the amine to be used is not less than about 1 mole and generally up to about 20 moles per mole of the compound (III). The amine is put into use in a suitable form such as gas, liquid and a solution in a suitable solvent.

The resultant of the first step is then, without any separation nor purification or after a suitable separation or purification, allowed to react with hydrogen sulfide. The reaction is generally conducted by introducing hydrogen sulfide into the reaction system at a temperature of about 0° C. to around room temperature. An amount of the hydrogen sulfide to be introduced is not less than about 1 mole and generally excessive and conventionally up to about 20 moles per mole of the compound (III).

The object compound thus produced can be isolated by per se conventional means, for example, by evaporating the solvent from the reaction system, by crystallization or by silica gel chromatography.

The object compound of the present invention wherein both $R_2$ and $R_3$ are hydrogen atom (i.e. a compound of the formula

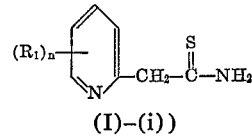

can be prepared also by the method of Group (C) (method (5), (6) or (7)).

In the method (5), a compound of the general formula

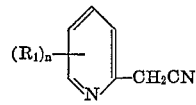

wherein $R_1$ and $n$ have the same meaning as defined above, is allowed to react with a compound of the general formula

wherein R has the same meaning as defined above.

The lower alkyl, aralkyl or aryl represented by R is exemplified by similar ones to those of $R_1$ and $R_2$.

The reaction is generally conducted in the presence of a suitable solvent (e.g. dimethylformamide, dimethylsulfoxide, ethyl ether, benzene, etc.).

It is desirable to conduct the reaction under acidic condition which is attained by adding a mineral acid (e.g. hydrochloric acid, sulfuric acid, etc.), preferably hydrochloric acid. The reaction proceeds at about −10° C. to about 150° C., and when no acid is added to the reaction system, it is recommended to carry out the reaction under heating.

An amount of the acid employed is generally about 0.1 to about 20 moles per mole of the compound (III). An amount of the compound (IV) employed is generally about 1 mole to about 10 moles per mole of the compound (III). The most desirable example of a technique for conducting this reaction is as follows. Namely, hydrogen chloride is introduced into a solution of the compound (III) under cooling at about −20° C. to about 20° C., then the compound (IV) is added to the mixture, and finally the resulting mixture is heated at about 20° C. to about 150° C.

The object compound as prepared above can be isolated by per se conventional means, for example, by evaporating the solvent from the reaction system.

In the method (6), the compound of the Formula III is allowed to react with hydrogen sulfide. The reaction is preferably conducted in the presence of a suitable solvent such as alcohols (e.g. methanol, ethanol, butanol, etc.), ethyl ether, petroleum ether, benzene, chloroform, carbontetrachloride, carbondisulfide, dimethylformamide and dimethylsulfoxide. It is preferable to conduct the reaction in the presence of a basic compound such as organic amines (e.g. pyridine, picoline, piperidine, diethylamine, triethylamine, diethylaniline, morpholine, or quinoline). The above-mentioned organic amine may take a part also as a reaction solvent. The reaction temperature ranges generally from about 0° C. to about 80° C. Practically, gaseous hydrogen sulfide is introduced into a reaction system to allow the reaction to proceed. An amount of the hydrogen sulfide to be introduced is about 1 to about 20 moles per mole of the compound (III).

The object compound can be recovered after per se conventional manner, for example, by evaporating the solvent from the reaction system, by crystallization or by silica gel chromatography.

In the method (7), the compound (III) is allowed to react with a compound of the general formula

(VI)

(wherein R′ has the same meaning as defined before). The alkyl of R′ is preferably a lower alkyl up to 4 carbons (e.g. methyl, ethyl, propyl, iso-propyl, butyl, iso-butyl, tert-butyl, etc.), in the presence of an acid such as mineral acids (e.g. hydrochloric acid, sulfuric acid, etc.).

Preferable acid is hydrochloric acid, which may be introduced in the reaction system in a state of hydrogen chloride gas. An amount of the acid to be used is about 0.1 to about 20 moles per mole of the compound (III). The reaction is generally conducted without a solvent, since the compound (VI can take a part as a solvent, but, if desired, a suitable inert solvent (e.g. benzene, toluene, xylene, etc.) may be used.

The reaction temperature generally ranges from about −10° C. to about 100° C. An amount of the compound (VI) employed is generally about 1 to about 3 moles, preferably around equimolar, per mole of the compound (III).

The object compound thus prepared can be isolated by per se conventional means, for example, by evaporating the solvent from the reaction system or by extracting the reaction mixture with a suitable solvent, followed by evaporation of the solvent.

The compound (I)–(i) prepared according to the method (4), (5), (6) or (7) may be, if desired, converted to the compound (I)–(iii) by the method (3).

The object compound of the present invention thus prepared according to the methods described above in detail can be converted after a conventional manner to an acid addition salt or a quaternary ammonium salt which is exemplified before. The quaternary ammonium salt can also be prepared directly by using the starting compound (i.e. compound (II), (I)–(i) or (III)) in a form of the corresponding quaternary ammonium salt.

The pyridine thioacetamide derivative of the present invention as well as its pharmaceutically acceptable acid salt are useful for treatment and/or prevention of duodenal ulcer and gastric diseases such as peptic ulcer, and hyperacidity. For such purposes, the object compound as well as its salt are administered per se or in a pharmaceutically acceptable form such as powder, granule, tablet, solution, and injection, together with a conventional adjuvant or carrier. Dosage of the compound as well as its salt varies depending on severity of the disease, kind of the compound, etc. and falls within the range of about 1 to about 100 milligrams per day for an adult. The administration of the object compound or its salt can prevent or treat the disease effectively without undesirable side effect. Further, the salt of the compound is easily soluble in water, and therefore, can be preferably used for injection.

For further explanation of the invention, the following examples are given, wherein "part" means "weight part" unless otherwise specified, and the relationship between "part" and "part by volume" corresponds to that gram and milliliter.

EXAMPLE 1

In a mixture of 40 parts by volume of pyridine and 11.8 parts by volume of triethylamine is dissolved 10.4 parts of 6-methyl-2-pyridineacetonitrile, followed by introduction of hydrogen sulfide into the solution for 3 days. After the pyridine is removed by evaporation, the resultant is dissolved in chloroform. The chloroform solution is passed through a column (5.5 x 30 cm.) packed with silica-gel, which is then eluted with chloroform-methanol-acetic acid (90:5:1 by volume). The solvent is removed from the eluate by evaporation and the residue is dissolved in ethanol. The ethanol solution is acidified with concentrated hydrochloric acid and subjected to evaporation to remove the ethanol. Twice recrystallization of the residue from ethanol gives 8 parts of 6-methyl-2-pyridinethioacetamide hydrochloride as prisms melting at 194 to 198° C. (decomposition).

EXAMPLE 2

In a mixture of 45 parts by volume of pyridine and 17.3 parts by volume of triethylamine is dissolved 17.3 parts of 5-ethyl-2-pyridineacetonitrile, followed by introduction of hydrogen sulfide for 2 days. The resultant is subjected to a silica-gel column chromatography in a similar manner to that in Example 1. The residue is dissolved in ethanol and the ethanol solution is acidified to pH 2 with concentrated hydrochloric acid, whereby crystals precipitate out. The crystals are recrystallized from ethanol to give 14.2 parts of 5-ethyl-2-pyridine-thioacetamide hydrochloride as pale orange pillars melting at 220 to 222° C. (decomposition).

EXAMPLE 3

Into a solution of 10 parts of 5-methyl-2-pyridineacetonitrile in a mixture of 50 parts by volume of pyridine and 10.6 parts by volume of triethylamine is introduced hydrogen sulfide at room temperature, followed by keeping under sealing. This series of process steps consisting of the introduction of hydrogen sulfide and keeping under sealing is repeated until the starting compound, 5-methyl-2-pyridineacetonitrile, is exhausted by the reaction. The solvent is removed from the reaction mixture, and ethanol is added to the residue, followed by concentration.

The addition of ethanol and the subsequent concentration are repeated several times. To the resultant is further added ethanol to give crystals. The crystals are dissolved in ethyl acetate, followed by extraction with diluted hydrochloric acid. The aqueous layer is subjected to filtration to remove insoluble sulfur. The filtrate is alkalified with sodium carbonate and extracted with ethyl acetate. The ethyl acetate layer is dried over anhydrous sodium sulfate and subjected to evaporation to remove the solvent. Recrystallization of the residue from ethanol gives 5-methyl-2-pyridinethioacetamide as crystals melting at 100 to 101° C.

The crystals are dissolved in ethanol. The solution is acidified to pH 1 to 2 with concentrated hydrochloric acid and subjected to evaporation to remove the solvent. The precipitated crystals are recrystallized from a mixture of methanol and ethyl acetate to give 8.1 parts of 5-methyl-2-pyridinethioacetamide hydrochloride as colorless belonites melting at 209 to 211° C. (decomposition).

EXAMPLE 4

To a mixture of 50 parts by volume of pyridine and 28 parts by volume of triethylamine is added 13 parts of 3-methyl-2-pyridineacetonitrile. Hydrogen sulfide is introduced into the mixture at room temperature, followed by keeping under sealing. This series of process steps consisting of the introduction of hydrogen sulfide and the subsequent keeping under sealing is repeated until the starting compound, 3-methyl-2-pyridineacetonitrile, is exhausted by the reaction. After removing the solvent by evaporation, the reaction mixture is washed well with ethanol, dissolved in chloroform and extracted with 1 N-hydrochloric acid. The extract is subjected to filtration to remove insoluble sulfur, followed by concentration under reduced pressure. The colorless crystals precipitated are recrystallized twice from methanolethanol (1:1 by volume) to give 12.5 parts of 3 - methyl-2-pyridinethioacetamide hydrochloride as colorless prisms melting at 214 to 216° C. (decomposition).

EXAMPLE 5

Into a mixed solution of 7.8 parts of 4-methyl-2-pyridineacetonitrile, 40 parts by volume of pyridine and 8.3 parts by volume of triethylamine is introduced hydrogen sulfide at room temperature for 2 days. The solvent is removed by evaporation from the reaction mixture and the residue is dissolved in ethanol. The ethanol solution is acidified to pH 2 with concentrated hydrochloric acid and concentrated to dryness. The concentrate is recrystallized from ethanol to give 3 parts of 4-methyl-2-pyridinethioacetamide hydrochloride as pale yellow needles melting at 200 to 201° C. (decomposition).

EXAMPLE 6

Into a mixed solution of 17.5 parts of 4-methoxy-2-pyridineacetonitrile, 60 parts by volume of pyridine and 17 parts by volume of triethylamine is introduced hydrogen sulfide at room temperature, followed by keeping under sealing. This series of process steps consisting of the introduction of hydrogen sulfide and the subsequent keeping under sealing is repeated until the starting compound, 4-methoxy-2-pyridineacetonitrile is exhausted by the reaction. The solvent is removed from the reaction mixture by evaporation and the residue is recrystallized twice from ethanol to give 13.7 parts of 4-methoxy-2-pyridinethioacetamide as pale brown crystals melting at 129 to 130° C.

The crystals are dissolved in ethanol and pH of the ethanol solution is adjusted to 2 with concentrated hydrochloric acid. The ethanol solution is subjected to evaporation to remove half a volume of the ethanol, and the resulting solution is decolorized with charcoal, followed by the addition of ethyl ether, whereby 13.4 parts of 4-methoxy-2-pyridinethioacetamide hydrochloride is obtained as fine crystals melting at 165 to 166° C. (decomposition).

EXAMPLE 7

In a mixture of 50 parts by volume of pyridine and 20 parts by volume of triethylamine is dissolved 10 parts of 2-quinolineacetonitrile. Into the solution is introduced hydrogen sulfide, followed by keeping under sealing. This series of process steps consisting of the introduction of hydrogen sulfide and the subsequent keeping under sealing is repeated until the starting compound, 2-quinolineacetonitrile, is exhausted by the reaction.

The reaction mixture is subjected to evaporation to remove the solvent, and ethanol is added to the syrupy residue, followed by concentration to dryness. The addition of ethanol and the subsequent concentration are repeated several times. To thus-obtained concentrate is further added ethanol. The precipitated crystals are dissolved in diluted hydrochloric acid and the insolubles are removed by filtration. The filtrate is alkalified with potassium hydroxide, followed by the extraction with chloroform. The chloroform layer is dried over anhydrous sodium sulfate and concentrated.

Recrystallization of the residue from ethanol gives 2-quinolinethioacetamide as yellow crystals melting at 153 to 154° C. (decomposition).

The crystals are dissolved in diluted hydrochloric acid and the solution is concentrated. The concentrate is recrystallized from methanol containing charcoal to give 10.69 parts of 2-quinolinethioacetamide hydrochloride as pale yellow crystals melting at 216 to 217° C. (decomposition).

EXAMPLE 8

To a solution of 21.6 parts of N-methyl-6-methyl-2-pyridineacetamide in 150 parts by volume of pyridine is added 21 parts of phosphorus pentasulfide. The mixture is heated under reflux for 5 minutes, followed by evaporation to remove the pyridine. After cooling, the reddish syrupy residue is alkalified with an aqueous sodium hydroxide solution. The alkaline mixture is extracted with chloroform and the chloroform layer is treated with hydrochloric acid, followed by filtration to remove insolubles.

The filtrate is alkalified with sodium carbonate, followed by extraction with chloroform. The chloroform layer is dried over anhydrous potassium carbonate, treated with charcoal and concentrated to dryness. To the concentrate is added petroleum ether to give crystals. The crystals are recovered by filtration and then recrystallized from a mixture of chloroform and petroleum ether and then from ethanol to give 14.47 parts of N-methyl-6-methyl-2-pyridinethioacetamide as pale yellow crystals melting at 128 to 129° C.

Into hot ethanol is dissolved 3.8 parts of N-methyl-6-methyl-2-pyridinethioacetamide. To the solution is added hydrochloric acid so as to adjust a pH value to 1 to 2, followed by concentration. The precipitated crystals are collected by filtration and recrystallized from ethanol to give 3.67 parts of N-methyl-6-methyl-2-pyridinethioacetamide hydrochloride as slightly yellowish crystals melting at 185 to 186° C. (decomposition).

EXAMPLE 9

To a solution of 6.4 parts of N-ethyl-6-methyl-2-pyridineacetamide in 50 parts by volume of pyridine is added 5.75 parts of phosphorus pentasulfide and the mixture is heated under reflux for 15 minutes. The resultant is treated in a similar manner to that in Example 1, whereby chloroform extract is given. The chloroform extract is dried and subjected to evaporation to remove the chloroform. The residue is washed with petroleum ether to give 5.25 parts of N-ethyl-6-methyl-2-pyridinethioacetamide as orange-red crystals melting at 73 to 74° C.

EXAMPLE 10

To a solution of 6.2 parts of N,N-dimethyl-6-methyl-2-pyridineacetamide in 50 parts by volume of pyridine is added 5.8 parts of phsophorus pentasulfide, and the mixture is heated under reflux for 5 minutes. The resultant is treated in a similar manner to that in Example 1, whereby chloroform extract is given. The chloform extract is subjected to silica-gel column chromatography (3.5 x 33 cm.) using chloroform-ethyl acetate-methanol (10:20:0.5 by volume) as an eluating solvent. The fractions containing the object compound are concentrated to give an oily substance, which is then dissolved in ethanol. The solution is adjusted to pH 2 and supplied with ethyl ether to precipitate crystals. Recrystallization of the crystals from a mixture of ethanol and ethyl ether gives 5.0 parts of N,N-dimethyl-6-methyl-2-pyridinethioacetamide as slightly yellowish crystals melting at 142 to 145° C.

EXAMPLE 11

To a solution of 200 parts of N-methyl-2-pyridineacetamide in 1000 parts by volume of pyridine is added 145 parts of phosphorus pentasulfide and the mixture is heated under reflux for 5 minutes. Pyridine is evaporated under reduced pressure, and a concentrated aqueous solution of sodium hydroxide is added to the residue. The mixture is subjected to a salting out with potassium carbonate, followed by extraction with ethyl ether. The ethyl ether layer is dried over anhydrous sodium sulfate and subjected to evaporation to remove ethyl ether. To the residue is added petroleum ether, whereby powder is precipitated. The powder is collected and dissolved in ethanol. The solution is acidified with concentrated hydrochloric acid and concentrated to dryness under reduced pressure. Crystallization of the residue from ethanol gives 178.5 parts of N-methyl-2-pyridinethioacetamide hydrochloride as crystals melting at 215° C. to 220° C. (decomposition).

In a similar manner N-benzyl-2-pyridinethioacetamide hydrochloride is prepared having a melting point of 180 to 181° C.

EXAMPLE 12

In a similar manner to that in Example 11, the following compounds are prepared.

EXAMPLE 13

To a solution of 1.04 parts of 6-methyl-2-pyrdineacetamide in 15 parts by volume of pyridine is added 0.75 part of phosphorus pentasulfide, and the mixture is heated under reflux for 10 minutes. The pyridine is evaporated from the resultant and the residue is alkalified with an aqueous sodium hydroxide solution. The solution is subjected to salting out with potassium carbonate, followed by extraction 5 times with about 200 parts by volume each of ethyl ether. The ethyl ether solution is dried over anhydrous sodium sulfate and filtered. The filtrate is concentrated, and passed through a silica-gel column (3.0 x 20 cm., particle size of 70 to 325 mesh), which is then eluted with ethyl acetate-chloroform (1:1 by volume). The fractions containing a substance which shows Rf value of 0.34 in a thin layer chromatography (silica-gel G 2.6 x 7.6 cm., developer ethyl acetate-chloroform= 1:1 by volume) are collected and concentrated to dryness. The concentrate is recrystallized from ethanol to give 0.334 part of 6-methyl-2-pyridinethioacetamide as slightly yellow needles melting at 116 to 118° C.

EXAMPLE 14

To a solution of 1.00 part of 5-ethyl-2-pyridineacetamide in 20 parts by volume of pyridine is added 0.8 part of phosphorus pentasulfide, and the mixture is heated under reflux for 5 minutes. The pyridine is evaporated from the resultant and the residue is adjusted in its pH value to 9 by the addition of an aqueous solution of sodium hydroxide, followed by 4 times extraction with 25 parts by volume each of ethyl ether. The ethyl ether solution is dried over anhydrous sodium sulfate and filtered. The filtrate is concentrated to 20 parts by volume and adjusted in its pH value to 2 by the addition of a few droplets of hydrochloric acid and is further concentrated to 10 parts by volume. After addition of 30 parts by volume of ethanol, the concentrate is further concentrated to 5 parts by volume and left standing. The precipitated crystals are recrystallized from ethanol to give 0.780 part of 5-ethyl-2-pyridinethioacetamide as slightly yellow needles melting at 208 to 209° C. (decomposition).

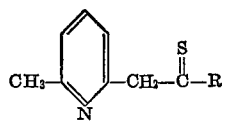

| Compound No. | R | Melting point (M.P.) or boiling point (B.P.) (° C.) | |
|---|---|---|---|
| | | HCl salt | Free base |
| 1 | —NHCH$_2$CH$_2$CH$_3$ | 152–154(M.P.) | |
| 2 | —NHCH$_2$CH$_2$CH$_2$CH$_3$ | 146–148(M.P.) | 139–143(B.P.) (0.25 mm. Hg). |
| 3 | —N⟨ ⟩ | 198–200(M.P.) (decomposition) | |
| 4 | —N(C$_2$H$_5$)$_2$ | 154–156(M.P.) (decomposition) | 125–130(B.P.) (0.2–0.3 mm. Hg). |
| 5 | —N⟨ ⟩O | 195–196(M.P.) (decomposition) | 97–98(M.P.). |
| 6 | —N⟨ ⟩ | 171–172(M.P.) (decomposition) | 149–151(B.P.) (0.6 mm. Hg). |
| 7 | —NHCH$_2$—⟨ ⟩ | 190–192(M.P.) (decomposition) | |

EXAMPLE 15

To a solution of 0.66 part of N-methyl-4-ethoxy-2-pyridineacetamide in 15 parts by volume of pyridine is added 0.50 part of phosphorus pentasulfide, and the mixture is heated under reflux for 30 minutes. The pyridine is evaporated from the resultant under reduced pressure and the residue is alkalified by the addition of an aqueous sodium hydroxide solution, followed by extraction with ethyl ether. The ethyl ether solution is dried over anhydrous sodium sulfate and filtered. The filtrate is concentrated and left standing. The precipitated crystals are recrystallized from ethanol to give 0.310 part of N-methyl-4-ethoxy-2-pyridinethioacetamide as pale yellow prisms melting at 103 to 105° C.

EXAMPLE 16

To a solution of 8.51 parts of N-phenyl-2-pyridineacetamide in 100 parts by volume of pyridine is added 5 parts of phosphorus pentasulfide. The mixture is heated under reflux for 40 minutes and concentrated. The concentrate is alkalified with an aqueous sodium hydroxide solution and subjected to salting out with the addition of potassium carbonate, followed by extraction with chloroform. The chloroform layer is dried over anhydrous potassium carbonate and filtered. The filtrate is concentrated, followed by the addition of ethyl ether. The precipitated crystals are recrystallized from ethanol to give 5.0 parts of N-phenyl-2-pyridinethioacetamide as yellow fine needles melting at 156.5 to 158° C.

EXAMPLE 17

To a solution of 1.37 parts of 2-quinolineacetamide in 25 parts by volume of pyridine is added 0.8 part of phosphorus pentasulfide. The mixture is heated under reflux for 6 minutes and concentrated. The concentrate is alkalified with the addition of an aqueous sodium hydroxide solution and subjected to salting out with the addition of potassium carbonate, followed by extraction with ethyl ether. The ethyl ether layer is dried over anhydrous potassium carbonate, and filtered. The filtrate is concentrated and passed through a column packed with silica-gel (70–325 mesh ASTM, 3.0 x 20 cm.), which is then eluted with ethyl acetate-chloroform (1:1 by volume). The fractions containing a substance showing $R_f$ value of 0.42 on a thin layer chromatograph (silica-gel G, 2.6 x 7.6 cm., developer, ethyl acetate-chloroform=1:1 by volume) are collected, decolorized with charcoal and filtered. The filtrate is concentrated to dryness and recrystallized twice from ethanol, whereby 0.23 part of 2-quinolinethioacetamide is given as yellow prisms melting at 152 to 154° C.

EXAMPLE 18

To a solution of 1.50 parts of N-methyl-2-quinolineacetamide in 20 parts by volume of pyridine is added 1 part of phosphorus pentasulfide. The mixture is refluxed for 5 minutes and concentrated. The concentrate is alkalified with an aqueous sodium hydroxide solution and subjected to salting out with the addition of potassium carbonate, followed by extraction with ethyl ether. The ethyl ether layer is dried over anhydrous potassium carbonate and filtered. The filtrate is concentrated to dryness and recrystallized twice from ethanol, whereby 0.57 part of N-methyl-2-quinolinethioacetamide is given as pale yellow needles melting at 130 to 131° C.

EXAMPLE 19

In a small portion of pyridine is dissolved 2.0 parts of 2-pyridineacetonitrile and the pyridine is evaporated. The residue is dried and dissolved in 10 parts by volume of pyridine. Into the solution is introduced anhydrous methylamine under ice-cooling until the solution is saturated with the same, followed by keeping standing at room temperature for 1 to 1.5 hours. Hydrogen sulfide is gradually introduced into the resultant under cooling with ice-water. The resulting mixture is kept in a tight seal at room temperature for 2 days, at the end of which time pyridine is evaporated and then water and ethyl acetate are added to the residue, followed by shaking.

The ethyl acetate layer is extracted 4 times with ethyl acetate. The ethyl acetate extracts are combined and shaken with water and then with aqueous sodium chloride solution, followed by drying over anhydrous sodium sulfate. The resultant is subjected to evaporation to remove the solvent, and the resulting syrup is cooled, whereby crystals are given. Petroleum ether is added to the crystals and the mixture is filtered to collect the crystals. The crystals are dissolved in ethanol with heating, followed by the addition of petroleum ether, whereby N-methyl-2-pyridinethioacetamide is given as colorless crystals melting at 89° C. to 90° C.

The crystals in ethanol are neutralized with hydrochloric acid and the resulting mixture is concentrated to dryness. The residue is recrystallized from ethanol to give 1.28 parts of N-methyl-2-pyridinethioacetamide hydrochloride as crystals melting at 215° C. to 220° C. (decomposition).

In a similar manner to the above, the following compounds are prepared.

| Starting material | | Compound produced | Melting point (° C.) |
|---|---|---|---|
| 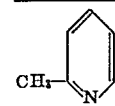 | $CH_3NH_2$ | 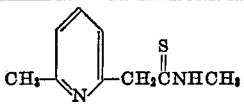 | 128–129. |
| 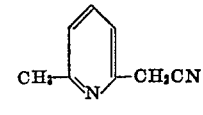 | $CH_3CH_2CH_2NH_2$ | 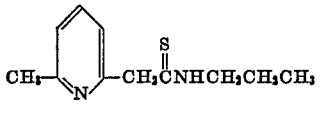 | 152–154 (hydrochloride). |
| 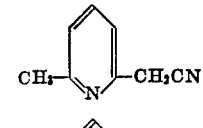 | $C_2H_5NH_2$ | 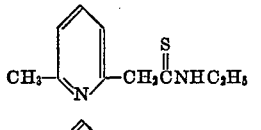 | 73–74. |
| 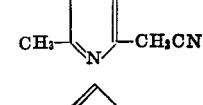 | $CH_3CH_2CH_2CH_2NH_2$ | 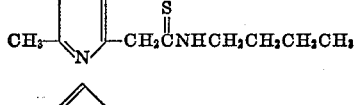 | 146–148 (hydrochloride). |
| 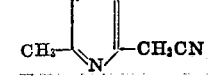 | 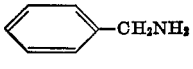$-CH_2NH_2$ | 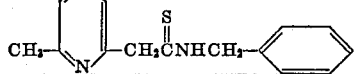 | 190–192 (hydrochloride). |

| Starting material | Compound produced | | Melting point (° C.) |
|---|---|---|---|
| pyridine-CH₂CN | NH₂-phenyl | pyridine-CH₂C(=S)NH-phenyl | 156.5-148. |
| quinoline-CH₂CN | CH₃NH₂ | quinoline-CH₂C(=S)NHCH₃ | 130-131. |
| 4-OC₂H₅-pyridine-CH₂CN | CH₃NH₂ | 4-OC₂H₅-pyridine-CH₂C(=S)NHCH₃ | 103-105. |
| pyridine-CH₂CN | C₆H₅—CH₂NH₂ | pyridine-CH₂-C(=S)-NHCH₂-C₆H₅ | 180 to 181 (hydrochloride). |

EXAMPLE 20

A mixture of 2 parts of 2-pyridinethioacetamide and 2 parts by volume of 30% aqueous methylamine solution is boiled for 10 minutes. Potassium carbonate is added to the reaction mixture, followed by extraction with chloroform. The chloroform layer is dried over potassium carbonate and filtered. The filtrate is concentrated and the crystals are taken by filtration. The crystals are washed with ethyl ether and purified by silica-gel column chromatography employing as a developer ethyl acetate-chloroform(1:1 by volume). Recrystallization of the resulting crystals from ethanol-petroleum ether gives 0.7 part of N-methyl-2-pyridinethioacetamide as yellow prisms melting at 89° C. to 90° C.

In a similar manner to the above, the following compounds are prepared.

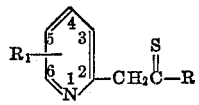

| R₁ (position) | R | Melting point (° C.) |
|---|---|---|
| H | —NH—C₆H₅ | 156.5-158. |
| CH₃ (6) | —NHCH₃ | 185-186 (decomposition, hydrochloride). |
| CH₃ (6) | —NHC₂H₅ | 73-74. |
| CH₃ (6) | —NHCH₂CH₂CH₃ | 152-154 (decomposition, hydrochloride). |
| CH₃ (6) | —NHCH₂CH₂CH₂CH₃ | 146-148 (decomposition, hydrochloride). |
| CH₃ (6) | —NHCH₂—C₆H₅ | 190-192 (hydrochloride). |
| CH₃ (6) | —N(CH₃)₂ | 142-145 (decomposition, hydrochloride). |
| CH₃ (6) | —N(C₂H₅)₂ | 154-156 (decomposition, hydrochloride). |
| CH₃ (6) | —N(morpholino) | 195-196 (decomposition, hydrochloride). |
| CH₃ (6) | —N(pyrrolidino) | 198-200 (decomposition, hydrochloride). |
| CH₃ (6) | —N(piperidino) | 171-172 (decomposition, hydrochloride). |
| —CH=CH—CH=CH— (5,6) | —NHCH₃ | 130-131. |
| H | —N(CH₃)₂ | 175-177 (hydrochloride). |
| H | NH—CH₂—C₆H₅ | 180-181 (hydrochloride). |

EXAMPLE 21

To a solution of 1.0 part of N-methyl-2-pyridineacetamide in 6 parts by volume of pyridine is added dropwise under ice-cooling 0.5 part by volume of tetrachloropyrophosphoric acid. Twenty minutes after the addition, hydrogen sulfide is introduced into the mixture for 5 minutes, followed by keeping with sealing at room temperature for 2 hours. Pyridine is evaporated, and water, potassium carbonate and ethyl acetate are added to the residue, followed by shaking well. The ethyl acetate layer is dried over anhydrous sodium sulfate and subjected to evaporation to remove the solvent. After cooling, petroleum ether is added to the residue. The precipitated crystals are recrystallized from ethanol-petroleum ether to give N-methyl-2-pyridinethioacetamide as crystals melting at 89° C. to 90° C.

Hydrochloride of the compound as obtained above is prepared by using ethanolic hydrochloric acid.

Melting point: 215° C. to 220° C. (decomposition).

EXAMPLE 22

To a mixture of 1.0 part of N,N-dimethyl-2-pyridineacetamide and 6 parts by volume of pyridine is added dropwise under ice-cooling 0.5 part by volume of tetrachloropyrophosphoric acid. Twenty minutes after the addition, hydrogen sulfide is introduced into the mixture for 10 minutes followed by keeping overnight with sealing at room temperature. Pyridine is evaporated, and water, potassium carbonate and chloroform are added to the residue. The mixture is shaken well, and the chloroform layer is dried over anhydrous potassium carbonate and concentrated. The concentrate is passed through a column packed with silica-gel (3.0 x 20 cm., particle size 0.05–0.2 mm.) and the column is eluted with acetic acid-chloroform (1:1 by volume). The eluate is concentrated and treated with ethanolic hydrochloric acid, whereby 0.45 part of N,N-dimethyl-2-pyridinethioacetamide hydrochloride is precipitated as crystals melting at 175 to 177° C.

In a similar manner to the above, the following compounds are prepared.

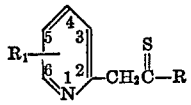

| $R_1$ (position) | R | Halogenating agent | Melting point (° C.) |
|---|---|---|---|
| H | NHCH$_3$ | Phosphorus oxychloride or phosphorus pentachloride. | 215–220 (decomposition, hydrochloride). |
| H | —NH—⟨⟩ | Tetrachloropyrophosphoric acid | 156.5–158. |
| CH$_3$ (6) | —NH$_2$ | ...do... | 194–198 (decomposition, hydrochloride). |
| CH$_3$ (5) | —NH$_2$ | ...do... | 209–211 (decomposition, hydrochloride). |
| C$_2$H$_5$ (6) | —NH$_2$ | ...do... | 220–222 (decomposition, hydrochloride). |
| CH$_3$ (3) | —NH$_2$ | ...do... | 214–216 (decomposition, hydrochloride). |
| CH$_3$ (4) | —NH$_2$ | ...do... | 200–201 (decomposition, hydrochloride). |
| CH$_3$O (4) | —NH$_2$ | ...do... | 165–166 (decomposition, hydrochloride). |
| C$_2$H$_5$O (4) | —NH$_2$ | ...do... | 103–105. |
| —CH=CH—CH=CH— (5,6) | —NH$_2$ | ...do... | 216–217 (decomposition, hydrochloride). |
| CH$_3$ (6) | —NHCH$_3$ | ...do... | 185–186 (decomposition, hydrochloride). |
| CH$_3$ (6) | —NHC$_2$H$_5$ | ...do... | 73–74. |
| CH$_3$ (6) | —NHCH$_2$CH$_2$CH$_3$ | ...do... | 152–154 (decomposition hydrochloride). |
| CH$_3$ (6) | —NHCH$_2$CH$_2$CH$_2$CH$_3$ | ...do... | 146–148 (decomposition, hydrochloride). |
| —CH=CH—CH=CH— (5,6) | —NHCH$_3$ | ...do... | 130–131. |
| CH$_3$ (6) | —N(CH$_3$)$_2$ | ...do... | 142–145 (decomposition, hydrochloride). |
| CH$_3$ (6) | —N(C$_2$H$_5$)$_2$ | ...do... | 154–156 (decomposition, hydrochloride). |
| CH$_3$ (6) | —N⟨morpholino⟩ | ...do... | 195–196 (decomposition, hydrochloride). |
| CH$_3$ (6) | —N⟨pyrrolidino⟩ | ...do... | 198–200 (decomposition, hydrochloride). |
| CH$_3$ (6) | —N⟨piperidino⟩ | ...do... | 171–172 (decomposition, hydrochloride). |
| H | NHCH$_2$—C$_6$H$_5$ | ...do... | 180 to 181 (hydrochloride). |

EXAMPLE 23

Dry hydrogen chloride is introduced into 50 parts by volume of dimethylformamide under ice-cooling until saturation, followed by the addition of 7.5 parts of thioacetamide and 6.7 parts of 6-methyl-2-pyridineacetonitrile. The mixture is heated at 90° C. to 100° C. with stirring for 30 minutes.

The reaction mixture is concentrated under reduced pressure and the residue is dissolved in a small amount of water. The solution is subjected to salting out with potassium carbonate, followed by extraction with chloroform. The chloroform layer is dried over anhydrous sodium sulfate and subjected to evaporation to remove the chloroform. The residue is dissolved in a small amount of water and the solution is acidified with hydrochloric acid and cooled. The precipitated crystals are crystallized from ethanol to give 8 parts of 6-methyl-2-pyridinethioacetamide hydrochloride as crystals melting at 194° C. to 198° C. (decomposition).

EXAMPLE 24

Into a mixture of 9.3 parts of ethyl phosphodithioate and 6.7 parts of 6-methyl-2-pyridineacetonitrile is introduced hydrogen chloride with stirring for 30 minutes. Water is added to the reaction mixture and the separated oily layer is removed. The aqueous layer is washed with chloroform and then with ethyl ether, followed by concentrating to dryness. The concentrate is crystallized from ethanol to give 3.5 parts of 6-methyl-2-pyridinethioacetamide hydrochloride as crystals melting at 194° C. to 198° C. (decomposition).

In a similar manner to Examples 22 or 23, the following compounds are prepared.

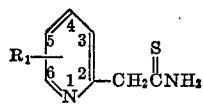

| $R_1$ (position): | Melting point (9 C.) |
|---|---|
| H | 89–90. |
| $CH_3$ (5) | 209–211 (decomposition, hydrochloride). |
| $C_2H_5$ (5) | 220–222 (decomposition, hydrochloride). |
| $CH_3$ (3) | 214–216 (decomposition, hydrochloride). |
| $CH_3$ (4) | 200–201 (decomposition, hydrochloride). |
| $CH_3O$ (4) | 165–166 (decomposition, hydrochloride). |
| $C_2H_5O$ (4) | 103–105. |
| —CH=CH—CH=CH— | 216–217 (decomposition). |

EXAMPLE 25

Dry hydrogen chloride is introduced under ice-cooling into 8 parts by volume of dimethylformamide until saturated, followed by the addition of 0.75 part of thioacetamide and 1.3 parts of 2-cyanomethyl-1-methyl-pyridinium chloride. The mixture is heated at 80° C. to 90° C. for 30 minutes with stirring, followed by concentrating under reduced pressure. The residue is recrystallized from ethanol. The crystals are dissolved in about 5 parts by volume of water and the solution is passed through a column packed with 20 parts by volume of anion ion exchange resin (chlor type) of 100 to 200 meshes, which is then eluted with about 30 parts by volume of water. The eluate and the washing are combined and concentrated under reduced pressure. The residue is recrystallized from ethanol to give 0.51 part of 2-thioacetamide-1-methyl-pyridinium chloride as crystals melting at 240° C. to 241° C. (decomposition).

EXAMPLE 26

To a solution of 1.5 parts of N-methyl-2-pyridine-acetamide in 10 parts by volume of pyridine is added under ice-cooling 0.7 part of thionyl chloride. One hour after the addition, hydrogen sulfide is introduced into the mixture for 5 minutes, following by keeping with sealing for a day. The mixture is treated in a similar manner to that in Example 22, whereby 1.1 parts of N-methyl-2-pyridinethioacetamide hydrochloride is given as crystals melting at 215 to 220° C. (decomposition).

EXAMPLE 27

A similar procedure to that in Example 26 is conducted except that phosgen is employed in place of thionyl chloride, whereby the same compound as Example 26 is obtained.

What is claimed is:

1. A member of the group consisting of a compound of the formula

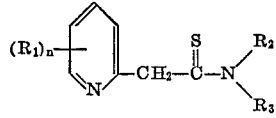

wherein $R_1$ is hydrogen, lower alkyl, lower alkoxy or halogen, $n$ is an integer of 1 or 2 and each of $R_2$ and $R_3$ independently represents hydrogen, lower alkyl, phenyl or benzyl with the proviso that when $R_1$ is hydrogen, one of $R_2$ and $R_3$ is hydrogen, and a salt thereof with the anion of a pharmaceutically acceptable acid.

2. The compound as in claim 1, said compound being 6-methyl-2-pyridinethioacetamide.
3. The compound as in claim 1, said compound being 5-ethyl-2-pyridinethioacetamide.
4. The compound as in claim 1, said compound being 5-methyl-2-pyridinethioacetamide.
5. The compound as in claim 1, said compound being 3-methyl-2-pyridinethioacetamide.
6. The compound as in claim 1, said compound being 4-methyl-2-pyridinethioacetamide.
7. The compound as in claim 1, said compound being 4-methoxy-2-pyridinethioacetamide.
8. The compound as in claim 1, said compound being N-methyl-6-methyl-2-pyridinethioacetamide.
9. The compound as in claim 1, said compound being N-ethyl-6-methyl-2-pyridinethioacetamide.
10. The compound as in claim 1, said compound being N,N-dimethyl-6-methyl-2-pyridinethioacetamide.
11. The compound as in claim 1, said compound being N-methyl-2-pyridinethioacetamide.
12. The compound as in claim 1, said compound being N-methyl-4-ethoxy-2-pyridinethioacetamide.
13. The compound as in claim 1, said compound being N-phenyl-2-pyridinethioacetamide.
14. The compound as in claim 1, said compound being N-n-propyl-6-methyl-2-pyridinethioacetamide.
15. The compound as in claim 1, said compound being N-n-butyl-6-methyl-2-pyridinethioacetamide.
16. The compound as in claim 1, said compound being 1-(6-methyl-2-pyridinethioacetyl)pyrrolidine.
17. The compound as in claim 1, said compound being N,N-diethyl-6-methyl-2-pyridinethioacetamide.
18. The compound as in claim 1, said compound being N-benzyl-6-methyl-2-pyridinethioacetamide.
19. The compound as in claim 1, said compound being N-benzyl-2-pyridinethioacetamide.

References Cited

FOREIGN PATENTS 1,939,349  2/1970  Germany _____ 260—294.8

OTHER REFERENCES

Schaeffer et al.: Chem. Abstracts, vol. 59 (10), pp. 11, 441-c–f, Nov. 11, 1963.

Burger: Medicinal Chemistry, 2nd ed., Interscience, p. 497, (1960).

ALAN L. ROTMAN, Primary Examiner

U.S. Cl. X.R.

260—247.1, 283 S, 286 R, 294.9, 293.69; 424—248, 258, 266, 267